United States Patent
Mol et al.

(10) Patent No.: US 6,274,186 B1
(45) Date of Patent: Aug. 14, 2001

(54) METHOD FOR CLEANING ITEMS IN PARTICULAR FILTERS, USED DURING FOODSTUFF PRODUCTION

(75) Inventors: Martinus Nicolaas Maria Mol, Leiden; Stephan Cornelus Johannes Van Hoof, Wageningen; Arie Cornelis Besemer, Amerongen, all of (NL)

(73) Assignee: Heineken Technical Services B.V., Amsterdam (NL)

( * ) Notice: Subject to any disclaimer, the term of this patent is extended or adjusted under 35 U.S.C. 154(b) by 0 days.

(21) Appl. No.: 09/194,692
(22) PCT Filed: May 26, 1997
(86) PCT No.: PCT/NL97/00294
  § 371 Date: Mar. 22, 1999
  § 102(e) Date: Mar. 22, 1999
(87) PCT Pub. No.: WO97/45523
  PCT Pub. Date: Dec. 4, 1997

(30) Foreign Application Priority Data

May 29, 1996 (NL) .................................................. 1003225

(51) Int. Cl.$^7$ ...................................................... A23C 7/02
(52) U.S. Cl. .................. 426/330; 426/330.2; 426/330.3; 426/330.4; 426/330.5; 426/330.6
(58) Field of Search ................................. 426/330, 330.2, 426/330.3, 330.4, 330.5, 330.6, 424

(56) References Cited

U.S. PATENT DOCUMENTS 5,831,043 * 11/1998 Fleche ................................. 536/18.5

FOREIGN PATENT DOCUMENTS

| 36 35 357 | 4/1988 | (DE) . |
| 0 392 395 | 10/1990 | (EP) . |
| WO 95/07303 | 3/1995 | (WO) . |
| WO 96/23579 | 8/1996 | (WO) . |

OTHER PUBLICATIONS

Database WPI, Section Ch, Week 9323, Derwent Publications Ltd., London, GB; Class A97, AN 93–186697, XP002024217 & RO 104 553 A (Dero Intr Detergenti), Feb. 25, 1992, see abstract.

* cited by examiner

Primary Examiner—Curtis E. Sherrer
(74) Attorney, Agent, or Firm—Pearne & Gordon LLP

(57) ABSTRACT

The invention relates to a method for cleaning apparatus used during the production of foodstuffs, in particular the filtration thereof, wherein this apparatus is contacted after use with a cleaning system based on the combination of a cyclic nitroxyl compound and a hypohalite.

16 Claims, No Drawings

METHOD FOR CLEANING ITEMS IN PARTICULAR FILTERS, USED DURING FOODSTUFF PRODUCTION

The invention relates to the cleaning of apparatus used during the production, processing or treatment of foodstuffs, more in particular the filtering thereof. An important example thereof is the cleaning of apparatus for brewing beer and more in particular the cleaning of filters, such as membrane filters for filtering residual beer and settled beer. Within the context of this invention the term "production" is used to indicate all treatments carried out on foodstuffs, such as production, treatment, processing and the like.

BACKGROUND OF THE INVENTION

During the production of foodstuffs, such as milk (products), fruit juices, beer, soft drinks (such as lemonades), cider, wine, sherry, port, distilled drinks and the like, the problem often occurs that apparatus must be cleaned after a certain period, because components from the material to be treated are adsorbed or absorbed or precipitate on surfaces of the apparatus, which is undesirable. This may in fact give rise to a disturbance of, on the one hand, the operation of the apparatus and, on the other hand, the quality of the final product.

The apparatus involved is the apparatus used during the treatment of foodstuffs, more in particular liquids, as indicated above. More in particular, filters are involved, such as membrane filters used for filtering the above products or semimanufactures therefor.

Examples of such treatments are the production and/or processing of milk and milk products, fruit juices, beer, soft drinks, cider, wine, sherry, port, distilled drinks and the like.

In the case of brewing beer the invention relates to, inter alia, the apparatus used during the preparation of malt, the conversion of malt and/or unmalted grain into wort and the further processing of the wort, with or without addition of extra components, such as hops, by fermentation to beer, as well as all auxiliary apparatus used therewith and coming in contact with main or secondary streams from these processes.

An example of the disturbance of the operation of the apparatus is found with the different filters used, e.g. the filters for filtering soft drinks, milk (products), wine, sherry, port, distilled drinks, fruit juices, lemonade, beer, such as settled beer, residual beer, but also the wort/spent grain separation, hot trub separation and cold trub separation.

The capacity of filters used in such processes, the flux, decreases in the course of time, which is of course undesirable. This particularly plays a role when use is made of membrane filters. This capacity decrease can be partly inhibited by rinsing back the filter. After some time, however, this is not sufficient, and it is therefore necessary to clean the filter.

A further examination has revealed that the apparatus, and more in particular the filters, become contaminated by a combination of all kinds of compounds, of which polysaccharides, oligosaccharides, proteins, β-glucanes, fats and polyphenols are important components. during the production Conventional cleaning techniques, e.g. based on catalyzed or uncatalyzed oxidation, e.g. with a peroxide/metal (manganese) complex hypochlorite or hypobromite, are not satisfactory, which appears from the fact that the flux cannot be restored to the original value or close thereto. Nor does the use of detergents or enzymes, such as proteases, carbohydrases, amylases, pullulanases, proteases and lipases, lead to the desired results.

There is therefore a need for an efficient cleaning system for cleaning apparatus for the production, as defined above, of liquid foodstuffs, which system is capable of effecting a proper cleaning, which must preferably be done within a short time (15–120 min) and during which substantially all contaminations are removed.

The invention is based on the surprising insight that it is possible to adequately clean apparatus used during the production of foodstuffs by using a cleaning system on the basis of a combination of a cyclic nitroxyl compound and a hypohalite. This involves removal of contaminations formed during the production of foodstuffs, e.g. precipitated on surfaces of the apparatus or in pores of filters.

SUMMARY OF THE INVENTION

The invention therefore relates to a method for cleaning apparatus used during the production of foodstuffs, in which this apparatus is contacted after use with a cleaning system based on the combination of a cyclic nitroxyl compound and a hypohalite in aqueous solution.

DETAILED DESCRIPTION OF THE INVENTION

Preferably, the cyclic nitroxyl compound is a substituted piperidine, such as 2,2,6,6-tetra-methylpiperidine-N-oxyl (TEMPO). This is a commercially available compound (CAS Reg. No. 2564-83-2).

In combination with a hypohalite, preferably a hypobromite, it is possible to obtain a rapid removal of contaminations by using catalytic amounts of TEMPO. The hypobromite, which is preferred, is preferably formed in situ from hypochlorite and alkali metal bromide (most preferably NaBr). It is to be noted that preference is given to the use of bromite, since it gives a considerably shorter cleaning time than the chlorite. It is also possible to generate the bromite from other components or to add it as such to the system.

The method according to the invention is most preferably carried out by contacting an aqueous solution of the nitroxyl compound, such as the different nitroxide radicals, e.g. 2,2,6,6-tetra-methylpiperidine-N-oxyl (TEMPO), 4-oxo-2,2,6,6-tetra-methylpiperidine-N-oxyl (OTEMPO), 4-hydroxy-2,2,6,6-tetra-methylpiperidine-N-oxyl (TEMPOL) and other derivatives having the same 2,2,6,6-tetra-methylpiperidine-N-oxyl (TEMPO) skeleton, as well as derivatives on the basis of 4,4-dimethyloxazolidine-N-oxyl (DOXYL) and 2,2,5,5-tetra-methylpyrrolidine-N-oxyl (PROXYL) and the hypohalite in water with the contaminated apparatus.

The concentration of the cyclic nitroxyl compound preferably ranges between 1 and 250 mg/l, more in particular between 2 and 25 mg/l. Such concentrations of nitroxyl compound can be properly combined with hypohalite ($Obr^-$ or $OCl^-$) concentrations of at least 0.5 g/l, preferably 0.75 to 10 g/l. In case a system on the basis of hypochlorite, alkali metal bromide and the nitroxyl compound is used, the amount of bromide is significantly lower than the amount of hypochlorite. Since the bromite is regenerated, bromide contents (calculated as Br) of not more than 1 g/l are sufficient at the above concentrations of the nitroxyl compound.

In a characteristic method a catalytic amount of TEMPO is used. Only minute amounts of the cyclic nitroxyl compound are necessary, since it functions as a catalyst for forming the active oxidant, the hypohalite, from hypohalide.

It is to be noted in this respect that the present system of cyclic nitroxyl compound and hypohalide is known per se, e.g. from WO-A 95/07303. This publication describes the oxidation of carbohydrates with primary hydroxyl groups. In no manner, however, does it appear therefrom that this system is useful for cleaning apparatus used for the production of foodstuffs, in which the nature of the contaminations is as different as indicated above. This is the more surprising as the conventional cleaning methods on the basis of hypohalite, e.g. with filters when brewing beer, do not give the desired effect.

The invention is applicable to all apparatus used during the processing of foodstuffs, and which contacts the main stream and/or the secondary streams of the production. More in particular, the invention is applicable to the cleaning of filters used for filtering milk, milk products, soft drinks, cider, wine, sherry, port, fruit juices, distilled drinks, beer, settled beer, residual beer, but also the wort/spent grain separation, hot trub separation and cold trub separation.

The contact between cleaning liquid and apparatus may be effected both statically and dynamically, that is to say: the liquid either is stationary or flows through the apparatus. Suitable contact times range between 5 minutes and 2 hours, which times of course also depend on the degree of contamination, the concentration of the components (more in particular the nitroxyl compound) and the temperature.

The pH of the cleaning liquid is preferably kept within the alkaline range. In practice, this is a value ranging between 7 and 12. When using only hypochlorite in combination with the nitroxyl compound, even weakly acid pH values are possible (pH>6). Since the cleaning is often accompanied with the formation of organic acids, the cleaning can be controlled by means of the amount of caustic required to maintain the adjusted pH. As soon as the caustic consumption strongly decreases, also after dosing HOCl/HOBr, it can be noticed that the cleaning is terminated. This system has the great advantage that a low concentration of oxidant is sufficient, so that damage to apparatus and parts can be decreased or even completely avoided.

After cleaning the apparatus is rinsed and can be used again. It is to be noted that the system according to the invention can be suitably used for each cleaning. It is also possible, however, to alternately clean the apparatus with, on the one hand, a conventional system, e.g. based on detergents, optionally in combination with peroxides and/or enzymes, and, on the other hand, the system according to the invention. It is also possible to use the system according to the invention as a kind of postcleaning, subsequent to a conventional system.

The invention will now be explained by means of some, non-limitative, examples.

EXAMPLE 1

By means of a module for filtering settled beer, which was provided with a non-used membrane filter, settled beer was filtered for some time at a pressure of 0.3 bar. The flux of the beer was determined at a number of times (A).

Then the filter was cleaned for 2 hours with a solution containing 4.5 g/l HOCl, 35 mg/l NaBr and 15 mg/l TEMPO. After the cleaning the test was repeated (B). This cycle was then carried out one more time (C). In the following table some results are listed.

TABLE

| Time (min) | Flux (1/hour/bar/m$^2$) | | |
|---|---|---|---|
| | A | B | C |
| 20 | 1100 | 1100 | 1400 |
| 30 | 850 | 1050 | 1100 |

What is claimed is:

1. A method for cleaning an apparatus used during the production of foodstuffs, comprising contacting said apparatus with a cleaning system comprising a cyclic nitroxyl compound and a hypohalite.

2. A method according to claim 1, wherein said apparatus is a filter used in the production of foodstuffs selected from the group consisting of milk, milk products, fruit juices, beer, soft drinks, lemonades, cider, wine, sherry, port and distilled drinks.

3. A method according to claim 1, wherein said apparatus is a membrane filter.

4. A method according to claim 1, wherein the cyclic nitroxyl compound is used in a concentration of 1 to 250 mg/l.

5. A method according to claim 1, wherein the cyclic nitroxyl compound used is selected from the group consisting of 2,2,6,6-tetra-methylpiperidine-N-oxyl, 4-oxo-2,2,6,6-tetra-methylpiperidine-N-oxyl and 4-hydroxy-2,2,6,6-tetra-methylpiperidine-N-oxyl.

6. A method according to claim 1, wherein the hypohalite used is a hypobromite.

7. A method according to claim 1, wherein the hypohalite used is a combination of hypochlorite and an alkali bromide.

8. A method according to claim 1, wherein the cleaning system is used as an aqueous solution.

9. A method according to claim 1, wherein said contacting with a cleaning system is preceded by a cleaning with a detergent cleaning system.

10. A method for producing one or more foodstuffs in an apparatus, comprising cleaning said apparatus using the method according to claim 1.

11. A method according to claim 1, wherein said apparatus is a filter and said foodstuffs is beer.

12. A method according to claim 5, wherein the cyclic nitroxyl compound used is 2,2,6,6-tetra-methylpiperidine-N-oxyl.

13. A method according to claim 10, wherein said one or more foodstuffs is beer.

14. A method according to claim 1, wherein said contacting with a cleaning system is preceded by a cleaning with a detergent with peroxide cleaning system.

15. A method according to claim 1, wherein said contacting with a cleaning system is preceded by a cleaning with a detergent with enzyme cleaning system.

16. A method according to claim 1, wherein said contacting with a cleaning system is preceded by a cleaning with a detergent with peroxide and enzyme cleaning system.

* * * * *

UNITED STATES PATENT AND TRADEMARK OFFICE
CERTIFICATE OF CORRECTION

PATENT NO. : 6,274,186 B1 Page 1 of 1
APPLICATION NO. : 09/194692
DATED : August 14, 2001
INVENTOR(S) : Martinus Nicolaas Maria Mol et al.

It is certified that error appears in the above-identified patent and that said Letters Patent is hereby corrected as shown below:

Title Page

Item (73) Assignee: after "Amsterdam (NL)", please insert --LHS Micro-Filtrations B.V., Hengelo (NL)--.

Signed and Sealed this

Seventh Day of September, 2010

David J. Kappos
*Director of the United States Patent and Trademark Office*